US010817782B1

(12) United States Patent
Rando

(10) Patent No.: US 10,817,782 B1
(45) Date of Patent: Oct. 27, 2020

(54) METHODS AND SYSTEMS FOR TEXTUAL ANALYSIS OF TASK PERFORMANCES

(71) Applicant: WorkStarr, Inc., Attleboro, MA (US)

(72) Inventor: Joseph Rando, Sharon, MA (US)

( * ) Notice: Subject to any disclaimer, the term of this patent is extended or adjusted under 35 U.S.C. 154(b) by 0 days.

(21) Appl. No.: 16/519,134

(22) Filed: Jul. 23, 2019

(51) Int. Cl.
*G06N 3/08* (2006.01)
*G06F 40/205* (2020.01)

(52) U.S. Cl.
CPC ............. *G06N 3/08* (2013.01); *G06F 40/205* (2020.01)

(58) Field of Classification Search
CPC .............................. G06N 3/08; G06F 17/2705
See application file for complete search history.

(56) References Cited

U.S. PATENT DOCUMENTS

| | | | |
|---|---|---|---|
| 9,690,461 | B2 | 1/2017 | Holler et al. |
| 10,042,636 | B1 | 8/2018 | Srivastava et al. |
| 10,235,646 | B2 | 3/2019 | Perry et al. |
| 10,241,654 | B2 | 3/2019 | Meyer et al. |
| 2005/0102394 | A1 | 5/2005 | Loveland |
| 2015/0339619 | A1 | 11/2015 | Dumont et al. |
| 2016/0125872 | A1* | 5/2016 | Golipour ................. G10L 13/10 704/260 |
| 2017/0249574 | A1 | 8/2017 | Knijnik et al. |
| 2017/0285897 | A1 | 10/2017 | Liensberger et al. |
| 2018/0189706 | A1 | 7/2018 | Newhouse et al. |
| 2018/0341903 | A1 | 11/2018 | Keen et al. |
| 2019/0026663 | A1 | 1/2019 | Homeyer et al. |
| 2019/0050771 | A1 | 2/2019 | Mehawade et al. |
| 2019/0066021 | A1 | 2/2019 | Tang et al. |

OTHER PUBLICATIONS

Burger, Rachel; I, project manager: the rise of artificial intelligence in the workplace; Capterra; Jun. 17, 2017; retrieved from: https://blog.capterra.com/i-project-manager-the-rise-of-artificial-intelligence-in-the-workplace/.

Weilewski, Euan; Automating project management with deep learning: How natural language processing can be used to classify project status updates; Towards Science; Jan. 17, 2019; retrieved from: https://towardsdatascience.com/automating-project-management-with-deep-learning-bd5b851235eb.

Asana, The only tool you need for task management and lists; Apr. 24, 2019; retrieved from: https://asana.com/uses/task-management?utm_campaign=NB--US--EN--Tasks--Desktop&utm_source=google&utm_medium=pd_cpc_nb&utm_content=341322437951&gclid=EAIaIQobChMIoPXxr4_p4QIVLf7jBx0SBAm0EAMYASAAEgL0KPD_BwE.

* cited by examiner

*Primary Examiner* — Austin Hicks
(74) *Attorney, Agent, or Firm* — Caldwell Intellectual Property

(57) ABSTRACT

A system for textual analysis of task performances. The system includes a receiving module operating on at least a server configured to receive at least a request for a task performance. The system includes a language processing module operating on the at least a server configured to parse the at least a request for a task performance and retrieve at least a task performance datum, categorize the at least a request for a task performance to at least a task performance list, and assign the at least a request for a task performance to a task performance owner. The system includes a task generator module configured to generate at least a task performance data element containing a task performance list label and a priority label.

19 Claims, 14 Drawing Sheets

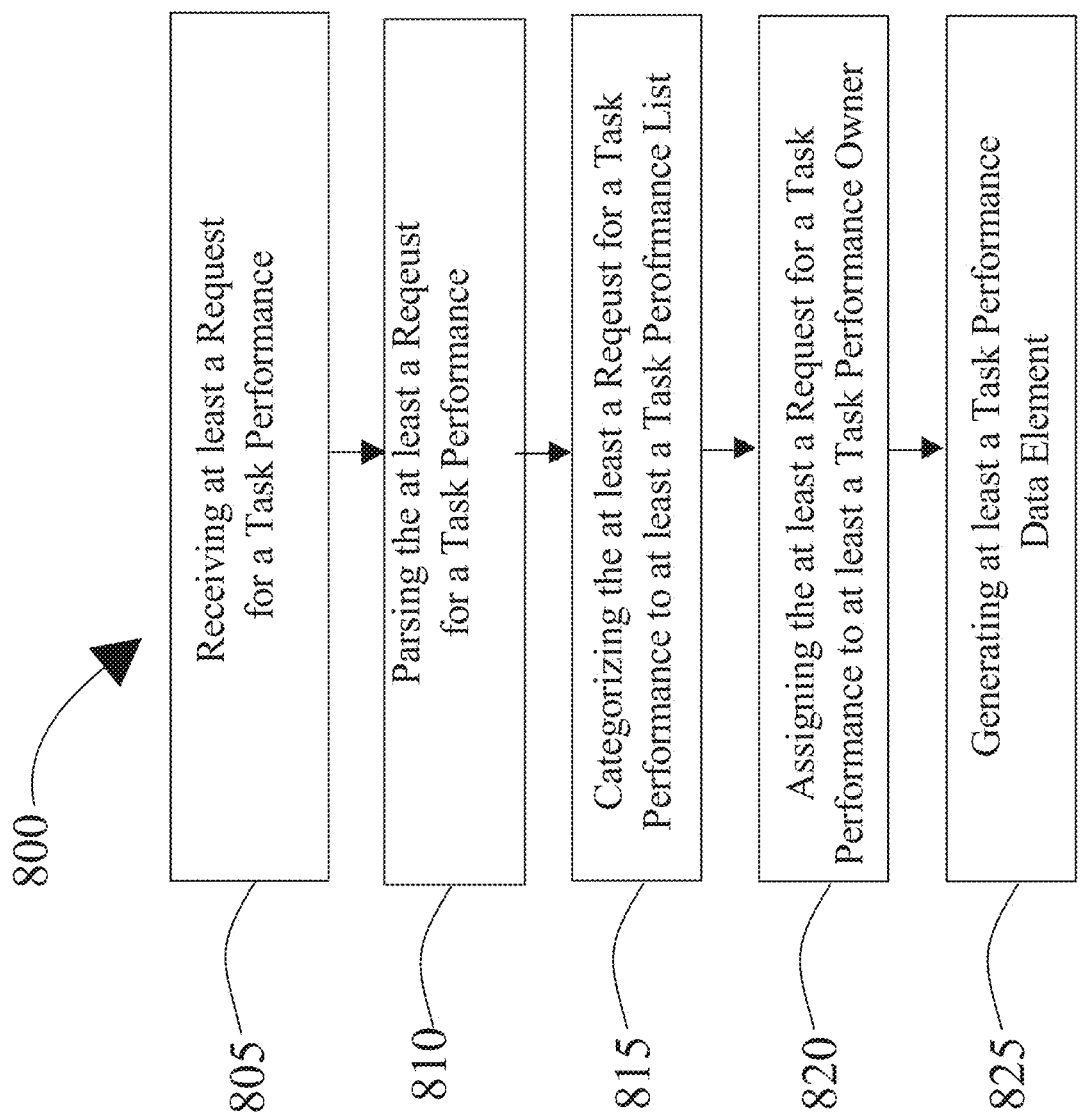

METHODS AND SYSTEMS FOR TEXTUAL ANALYSIS OF TASK PERFORMANCES

FIELD OF THE INVENTION

The present invention generally relates to the field of artificial intelligence. In particular, the present invention is directed to methods and systems for textual analysis of task performances.

BACKGROUND

Automated textual analysis and correct usage of textual analysis can be challenging due to the quantity of text to be analyzed along with knowing what to do with text that has been analyzed. Incorrect use of text can lead to errors in transmission as well as cluttered information that takes up electronic space.

SUMMARY OF THE DISCLOSURE

A system for textual analysis of task performances. The system includes a receiving module operating on at least a server wherein the receiving module is designed and configured to receive at least a request for a task performance. The system includes a language processing module operating on the at least a server designed and configured to parse the at least a request for a task performance and retrieve at least a task performance datum. The language processing module extracts at least a datum from a database using the at least a request for a task performance. The language processing module categorizes the at least a request for a task performance to at least a task performance list. The language processing module assigns the at least a request for a task performance to at least a task performance owner. The language processing module assigns the at least a request for a task performance a priority. The system includes a task generator module operating on the at least a server designed and configured to generate at least a task performance data element as a function of the at least a task performance datum and containing a task performance list label and a priority label. The system includes a transmission source module operating on the at least a server wherein the transmission source module is designed and configured to transmit the at least a task performance data element containing the task performance list label and the priority label to at least a user device.

A system for textual analysis of task performances. The system includes a receiving module operating on the at least a server wherein the receiving module is designed and configured to receive at least a request for a task performance. The system includes a language processing module operating on the at least a server wherein the language processing module is designed and configured to parse the at least a request for a task performance and retrieve at least a task performance datum. The language processing module categorizes the at least a request for a task performance to at least a task performance list. The language processing module assigns the at least a request for a task performance to at least a task performance owner. The system includes a task generator module designed and configured to generate at least a task performance data element as a function of the at least a task performance datum and containing a task performance list label and a priority label.

A method of textual analysis of task performances. The method includes receiving by at least a server at least a request for a task performance. The method includes parsing by the at least a server the at least a request for a task performance to extract at least a task performance datum. The method includes categorizing by the at least a server the at least a request for a task performance to at least a task performance list. The method includes assigning by the at least a server the at least a request for a task performance to at least a task performance datum owner. The method includes generating by the at least a server at least a task performance data element as a function of the at least a task performance datum and containing at least a task performance list label and a priority label.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 7A-F are screenshots illustrating exemplary embodiments of a graphical user interface for digitally building task performances;

FIG. 8 is a flow diagram illustrating an exemplary embodiment of a method of textual analysis of task performances.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for textual analysis of task performances. In an embodiment, at least a request for a task performance may be received by at least a server. At least a request for a task performance may include a description of a task that a user needs to have completed. The at least a request for a task performance may then be parsed to extract key words that may relate to the task. This may include for example, information pertaining to when the task needs to be completed or if there are sub-tasks that the task needs to be further broken down into. The at least a request for a task performance may then be assigned to at least a task performance owner who will be in charge of ensuring completion of the task. In an embodiment, the task performance owner may not be the user who originally generated the at least a request for a task performance. The server then generates at least a task performance data element that includes a task performance list label categorizing the task correctly and a priority label indicating the importance and how rapidly the task must be completed.

Figure 1:
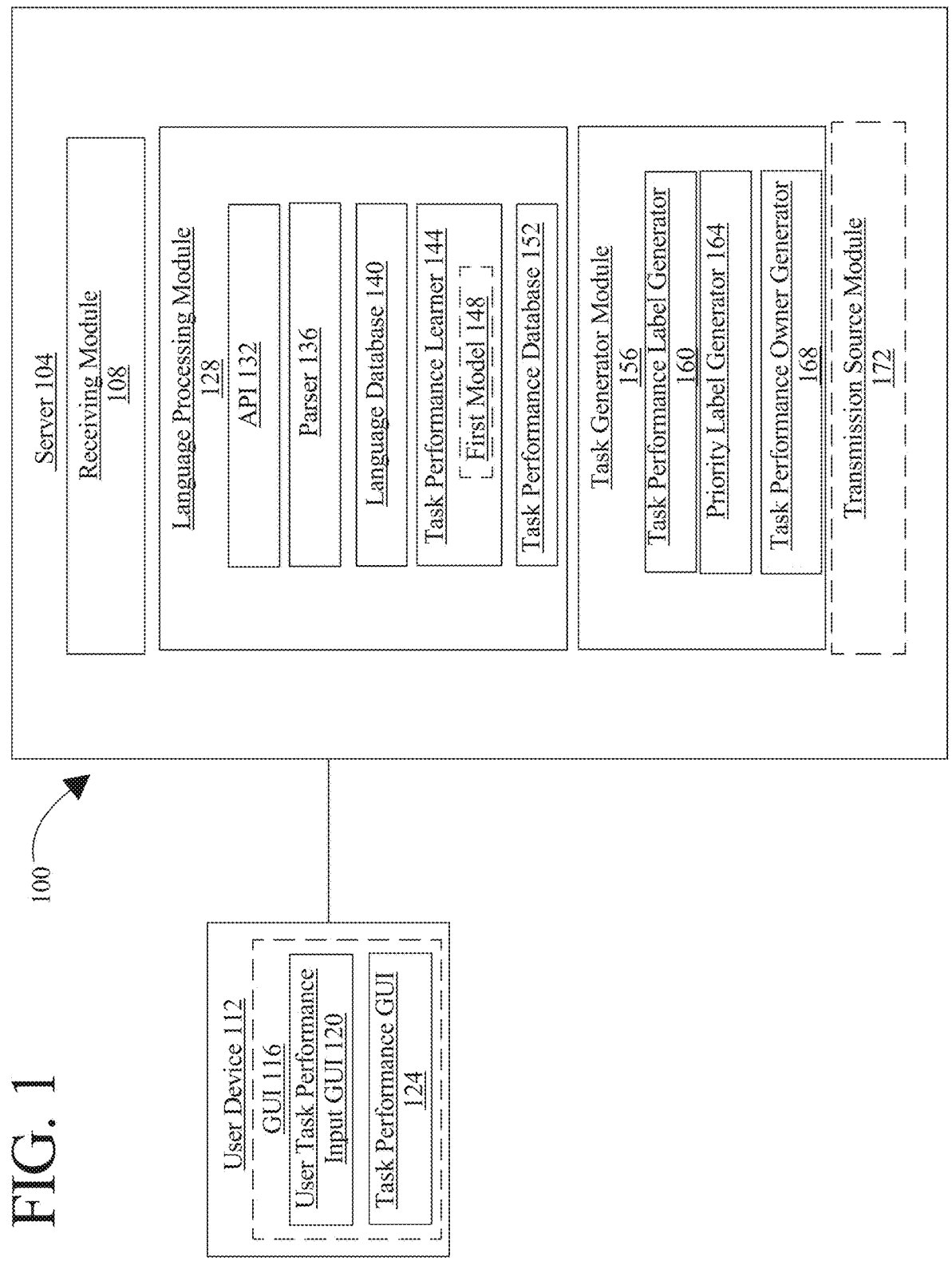
FIG. 1 is a flow diagram illustrating an exemplary embodiment of a system for textual analysis of task performances.

Referring now to the drawings, FIG. 1 illustrates an exemplary system 100 for textual analysis of task performances. System 100 includes at least a server 104. At least a server 104 may include any computing device as described herein, including without limitation a microcontroller, microprocessor, digital signal processor (DSP) and/or system on a chip (SoC). At least a server 104 may include, be included in, and/or communicate with a mobile device such as a mobile telephone or smartphone. At least a server 104 may include a single computing device operating independently, or may include two or more computing device operating in concert, in parallel, sequentially or the like; two or more computing devices may be included together in a single computing device or in two or more computing devices. At least a server 104 may communicate with other devices such as a user device as described in more detail below through a network interface. Network interface device may be utilized for connecting at least a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 104 may include but is not limited to, for example, a at least a server 104 or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker, in an embodiment, this may enable scalability of system 100 and/or computing device.

With continued reference to FIG. 1, system 100 includes a receiving module 108 operating on the at least a server. Receiving module 108 may include any suitable hardware or software module. In an embodiment, receiving module 108 is designed and configured to receive at least a request for a task performance. At least a request for a task performance as used herein includes a description of any task that needs to be completed. A task may include a personal task, work related task, community involvement task, and the like. For example, a task may include a work-related task such as creating a rideable rocket toy for toddlers or surveying a rideable rocket toy market. In yet another non-limiting example, a task may include a personal task such as obtaining a painter or setting up a weekly grocery allocation. A task may include a community involvement task such as preparing foodstuffs for a local food pantry or organizing a charity softball tournament. A task may relate to a hobby or leisure time activity such as an appointment with a personal trainer or participating in a spartan race. A task may include a project and/or an action. A project as used herein includes a task that includes at least a sub-task. A sub-task, as used herein includes an element of a task that may be completed as part of a task. A sub-task may include a task broken down into smaller steps. In an embodiment, sub-tasks may be broken down indefinitely into further sub-tasks. For example, a project such as creating a rideable rocket toy for toddlers may be broken down into sub-tasks that may include several steps necessary to complete the project. This may include for example, developing three rideable rocket toys, choosing a rideable rocket toy, building a prototype rideable rocket toy, performing a rideable rocket toy market analysis, finalizing a rideable rocket toy rollout plan, and producing and a rideable rocket toy. In yet another non-limiting example, a task may be created by John G. that is described as finding a new maintenance worker for an air-conditioner. In such an instance, John G. may break down the task into sub-tasks that include: make a list of 3 companies, call companies to request a proposal, review proposals, and choose company. Sub-tasks may be assigned to other people as described below. For example, John G. may assign a sub-task such as to call workers to request proposal to his assistant, who may break that sub-task down further into three different sub-tasks, one for each individual that John G.'s assistant calls. An action as used herein includes a task that does not contain any sub-task. An action may include for example, a task such as buying new shoes, or ordering wood. In an embodiment, an action may be completed in one step and may not contain any smaller steps that need to be completed in order to complete the action. In an embodiment, an action may be transformed into a project when a sub-task has been added and/or assigned.

With continued reference to FIG. 1, at least a request for a task performance may be received from a user device 112. User device 112 may include an additional computing device, such as a mobile device, laptop, desktop computer, or the like. In an embodiment, user device 112 may be a computer and/or workstation operated by a user. User may include an individual who creates at least a request for a task performance and/or an individual who has been assigned at least a request for a task performance. At least a request for a task performance may be received from a conversational response. Conversational response as used herein may include any communication from at least a user. Conversational response may include for example, an email, message, textual documentation of a conversation, document, notes, explanation, description, and the like that contains a communication from at least a user. Conversational response may include a communication between two or more users, such as for example an email between two users or an email sent to a group of users such as an email thread between a knitting club group or a document containing input from three users in a shared location.

With continued reference to FIG. 1 user device 112 may include a graphical user interface (GUI 116), which may display information pertaining to at least a request for a task performance. GUI 116 may include without limitation a form or other graphical element having data entry fields, where a user may enter information describing one or more requests for a task performance as described in more detail below. GUI 116 may allow for interaction between a user and system 100 to display task performances which may be categorized in specific categories as described below in more detail.

With continued reference to FIG. 1, GUI 116 may include user task performance input GUI 120 which may allow for and display user task performance inputs to allow a user to input information pertaining at least a request for a task performance. User task performance input GUI 120 may contain data entry fields that a user may enter specific information into such as for example by textual inputs and/or voice to text commands. For example, data entry fields may include without limitation a field containing a title whereby a user can enter a title describing at least a request for a task performance. For example, a title may include "Create rideable rocket toy for toddlers (RRS)." Data entry fields may include without limitation a field containing an assigned to option whereby a user can assign at least a request for a task performance to an individual. For example, a user may assign at least a request for a task performance to user and/or to another individual such as a coworker, family member or friend. In an embodiment, field containing an assigned to option may include a field where a user can enter an email address for the individual user is assigning at least a request for a task performance to. In an embodiment, as user types in a contact to assign to, a field may pop up and generate a list of previous contacts that a user has entered to make selection easier if a contact's information has been previously entered and/or assigned to. In such an instance, a user may select a contact from a pop-up field by highlighting a contact and selecting the contact. In an embodiment, assignments of tasks may be modified whereby a new assignee may be chosen such as when a task creator or assignor wishes to assign a task and/or sub-task to a new assignee. In an embodiment, a new task may initially be assigned to the task creator as a default. The task creator may then assign the task to another person or assignee by typing the other person's name or email address in the assigned to field. In an embodiment, an assignee may receive an email containing a task assignment notice detailing the task that has been assigned, while the task will appear on the assignor's waiting for list and have a status of "pending approval." In an embodiment, assigned to field may contain a drop-down menu selection containing connections and contacts who user may select to assign a task to. In an embodiment, assigned to field may contain a customizable field whereby a user can begin to type information into the assigned to field and system 100 will match text that user enters with names, usernames, and/or email addresses of user's connections and contacts. User may then select a choice from the drop-down menu such as by highlighting a selection. In an embodiment, a user may assign a task silently, whereby the assignee may not be notified of the task. A user may assign a task silently such as when the user does not know the assignee's email address, a user wants to delay assigning a task until a later date or time, or the user may feel uncomfortable about assigning a task to a superior or thinks that it will reflect poorly on user or in bad form. In an embodiment, a silent assignment may be performed such as by checking a box that states, "do not notify assignee." In such an instance, when an assignor unselects "do not notify assignee" then the assignee may be notified such as by email as described above.

With continued reference to FIG. 1, data entry fields may include without limitation a field containing an assigned by option whereby a user can enter information pertaining to who is assigning the at least a request for a task performance. For example, at least a request for a task performance may be assigned by user and/or by another. Data entry fields may include without limitation a field containing a relates to option whereby a user can enter information describing the field or category that at least a request for a task performance relates to. Category may include a class of items having particular shared characteristics. For example, at least a request for a task performance that is titled "create rideable rocket toy for toddlers (RRS)" may relate to a category such as new products. In yet another non-limiting example, at least a request for a task performance that is titled "place a job ad on a job board" may relate to a category such as recruiting. Data entry fields may include without limitation a field containing a start date which may include information as to when at least a request for a task performance may be initiated. For example, a start date may be listed as today if it will be started right away or may contain a future date such as next week, next month, or some specific date in the future. Data entry fields may include without limitation a field containing due date which may include information as to when at least a request for a task performance must be completed by. For example, a due date may list a specific date by which at least a request for a task performance must be completed by, such as October $15^{th}$. In yet another non-limiting example, a due date may list a date in terms of weeks, months, and/or years by which at least a request for a task performance must be completed by, such as in 7 days, in 14 days, in 2 weeks, and the like. Data entry field may include without limitation a field containing a description, which may include information describing details and features of at least a request for a task performance. For example, at least a request for a task performance such as to "define rideable rocket toy requirements" may include a description such as "define the requirements for the rideable rocket toy to maximize market share in the toddler market." In an embodiment, data entry fields may be completed by a voice memo that may capture a user's inputs for certain data fields. For example, a user who is driving a motor vehicle may complete data entry fields through a voice to text option contained within GUI 116.

With continued reference to FIG. 1, data entry fields may include without limitation, at least a field containing information unique to each individual user of system 100. This may allow for actions and/or projects specific to each user to be displayed on user's own action list and/or task performance list as described in more detail below. For example, data entry field may include without limitation a field that prompts each user to enter user's first name and last name. Data entry field may include without limitation a field that allows for a user to create a unique username. Data entry field may include without limitation a field that allows for a user to create a password that may be associated with user's unique username. In an embodiment user may be prompted to enter password a second time. Data entry field may include without limitation demographic information pertaining to a user such as user email address, user mobile phone number, user other phone numbers such as home, office and the like, user address, and/or user company name. Data entry field may include without limitation a field that allows a user to optionally upload a photo of themselves. Data entry field may include without limitation a field that allows a user to enter skills that they possess such as for example punctuality, organized, diligence, leadership, basic computer skills, oral speaking skills, and the like.

With continued reference to FIG. 1, GUI 116 may contain task performance GUI 124. Task performance GUI 124 may display task performances that a user needs to complete. In an embodiment, task performances may be grouped into categories, organizing task performances as a function of if a task performance contains sub-tasks or not and/or if a task performance will be performed by user or another person. In an embodiment, task performances may be organized onto lists such as those generated by language processing module as described in more detail below. This may include for example, an action list, a project list, and/or a waiting for list as described in more detail below and in reference to FIG. 2.

With continued reference to FIG. 1, at least a request for a task performance may include at least a task performance file. Task performance file as used herein, includes any and all information pertaining to at least a request for a task performance. Information pertaining to at least a request for a task performance may include for example, discussion threads between users pertaining to the at least a request for a task performance. Information may include messages sent between users or messages that user may transmit to himself or herself pertaining to the at least a request for a task performance. Information may include files pertaining to the at least a request for a task performance. For example, at least a request for a task performance such as painting user's fence may include a file containing price estimates from three different painters. Information may include notes pertaining to the at least a request for a task performance. Notes may include for example user's thoughts and reflections after interviewing three different painters to paint user's house. Information may include appointments pertaining to the at least a request for a task performance. For example, at least a request for a task performance such as finding a landscaper to mow user's lawn may include appointments user has scheduled with different landscaping companies. In yet another non-limiting example, appointments may include appointments user has had or will have with other users who may participate with the at least a request for a task performance. For example, at least a request for a task performance such as recruiting a new hire at a company may include appointments a user has already had with potential job applicants as well as future appointments user may have with other potential job applicants. In such an instance, appointments with other co-workers in addition to user may be contained within appointments section, such as when a potential job applicant may meet with three different individuals within the company.

With continued reference to FIG. 1, system 100 includes a language processing module 128 operating on the at least a server. Language processing module 128 may include any suitable hardware or software module. Language processing module 128 may be designed and configured to parse the at least a request for a task performance and retrieve at least a task performance datum, categorize the at least a request for a task performance to at least a task performance list, and assign the at least a request for a task performance to at least a task performance owner. Language processing module 128 may be configured to extract from at least a request for a task performance one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols. Textual data may be parsed into segments, which may include a simple word (sequence of letters separated by whitespace) or more generally a sequence of characters as described previously. The term segments as used herein refers to any smaller, individual groupings of text from a larger source of text; segments may be broken up by word, pair of words, sentence, or other delimitation. These segments may in turn be parsed in various ways. Textual data may be parsed into words or sequences of words, which may be considered words as well. Textual data may be parsed into "n-grams", where all sequences of n consecutive characters are considered. Any or all possible sequences of segments or words may be stored as "chains", for example for use as a Markov chain or Hidden Markov Model.

With continued reference to FIG. 1, language processing module 128 may parse at least a request for a task performance to retrieve a task performance datum. Task performance datum as used herein, may include one more keywords pertaining to at least a request for a task performance. Keywords may include relevant information relating to the at least a request for a task performance and may include for example information pertaining to a category of at least a request for a task performance and/or at least a task performance owner. Category may include for example information pertaining to a task performance list, such as whether at least a request for a task performance may be placed on action list, project list, and/or waiting for list. Category may include for example information pertaining to one or more of the data entry fields as described above such as relates to data field, description field, and the like. Keywords may be extracted by language processing module 128 by creating associations between one or more words extracted from at least a request for a task performance including without limitation mathematical associations, between such words, and/or associations of extracted words with categories of task performances. For example, associations between at least a request for a task performance that includes an entry such as "schedule follow-up with Larry" may be associated with a category of task performance such as work because Larry is a colleague from work. Associations between extracted keywords may include mathematical associations, including without limitation statistical correlations between keywords, at least a request for a task performance, and/or categories of task performances. Statistical correlations and/or mathematical associations may include probabilistic formulas or relationships indicating, for instance, a likelihood that a given extracted word indicates a given category of task performance, and/or a given task performance owner. As a further example, statistical correlations and/or mathematical associations may include probabilistic formulas or relationships indicating a positive and/or negative association between a keyword and/or a category of at least a task performance and/or at least a task performance owner; positive or negative indication may include an indication that a given document is or is not indicating a category of task performance, and/or that a certain individual is or is not a task performance owner. For instance, and without limitation, a negative indication may be determined from a phrase such as "John is not allowed to set up interviews with new job candidates," whereas a positive indication may be determined from a phrase such as "Sally is allowed to set up interviews with new job candidates," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in a memory located on the at least a server.

With continued reference to FIG. 1, language processing module 128 may contain application programming interface 132 (API). API 132 may contain communication protocols that may specify communications between for example, between language processing module 128 and other modules contained within server 104 and/or communications with GUI 116. Persons skilled in the art will appreciate that the components of API 132 may be not be physically resident within server 104 but may also be accessed through local or wide networks.

With continued reference to FIG. 1, language processing module 128 may contain parser 136. Parser 136 may parse at least a request for a task performance to retrieve a task performance datum as described in more detail above. Parser 136 may parse content of at least a request for a task performance received from a user device 112. Parser 136 may parse content of a conversational response to determine relevant portions to retrieve a task performance datum. Conversational response may include any communication from at least a user. Conversational response may include for example, an email, message, textual documentation of a conversation, document, notes, explanation, description, and the like that contains a communication from at least a user. In an embodiment, conversational response may include a communication from a plurality of users such as for example an email thread involving six different participants. In such an instance, parser 136 may parse the email thread containing messages from the six different participants to retrieve a task performance datum. In an embodiment, parser 126 may parse at least a request for a task performance containing an input from user device 112 and a conversational response.

Still referring to FIG. 1, language processing module 128 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word keyword, a given relationship of such keywords to categories of task performances, and/or a task performance owner. There may be a finite number of keywords, a given relationship of such keywords to categories of task performances, and/or a given task owner to which an extracted word may pertain; an HMM inference algorithm, such as the forward-backward algorithm or the Viterbi algorithm, may be used to estimate the most likely discrete state given a word or sequence of words. Language processing module 128 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module 128 may contain language database 140. In an embodiment, parser 136 may access language database 140 to determine the meaning of at least a request for a task performance. Language database 140 may contain a glossary table that may contain information such as contextual meaning of at least a request for a task performance. Language database 140 may contain a voice recognition table that may identify spoken commands such as when a user interfaces with GUI 116 through a voice to text option. Language database 140 may contain a natural language table that may contain information pertaining to meaning of common language terms used in general conversations.

With continued reference to FIG. 1, language processing module 128 may categorize the at least a request for a task performance to at least a task performance list and assign the at least a task performance to at least a task performance owner. At least a request for a task performance may be categorized as a function of at least a task performance datum. In an embodiment, task may be categorized utilizing task performance learner as described in more detail below. In such an instance, task performance learner may categorize task performances utilizing machine-learning and generating machine-learning models, including any of the machine-learning models as described herein. Task performance list may include groupings of requests for a task performance based on common shared characteristics. Task performance list may include an action list. Action list may include a grouping of task performances that includes only action items. Action items may include actions that do not contain sub-tasks. Action items may include for example, a one-time action that does not contain sub-tasks such as ordering a pair of shoes, buying airline tickets to France, placing a request for dinner, and the like. In an embodiment, an action may be transformed into a project when a sub-task is added to an action, whether by a user and/or assigned by someone else. For example, an action such as buying a pair of shoes may be transformed into a project when a sub-task such as researching best evening dress shoes is added to the action. In yet another non-limiting example, an action such as schedule a date for Frank's retirement party may be transformed into a project when a user is assigned a sub-task such as call Mary and call Joe to see when they are available for Frank's retirement party.

With continued reference to FIG. 1, action items may contain data entry fields that allow a user who has created an action to enter details pertaining to an action. In an embodiment, action list may include an effort to complete data field that may contain information describing by a user the amount of time they estimate it will take to complete an action. In an embedment, an action detail data field may include a "mark complete" option that a user may mark to signal an action item as complete.

With continued reference to FIG. 1, task performance list may include a project list. Project list may include a grouping of task performances that includes only projects. Projects may include actions that do contain sub-tasks. In an embodiment, a project may be transformed into an action such as when a project contains only one sub-task that is either eliminated and/or completed. Project items may include a list of all current projects pertaining to a user such as a project for buying a new car, a project for organizing a dinner party, and a project for interviewing a new assistant manager at work. Projects may contain sub-tasks that may be constantly updated and/or broken down into further sub-tasks. In an embodiment, a sub-task may be broken down into a subsequent sub-task that may be further broken down into a subsequent sub-task. For example, a sub-task such as mowing the lawn may be broken down into a subsequent sub-task such as trim the hedges which may be broken down into a subsequent sub-task such as purchase new hedging equipment which may be further broken down into a sub-task such as take a trip to Home Depot. In yet another embodiment, a sub-task such as clean out the refrigerator may be broken down into a subsequent sub-task such as buy cleaning supplies which may be broken down into a subsequent sub-task such as buy bleach and ammonia. In an embodiment, a sub-task may be broken down indefinitely. Task performance list may include a waiting for list. Waiting for list may include a list of tasks assigned by a user to other people. For example, a sub-task such as purchase napkins that user has assigned to user's spouse, may be included on waiting for list. In yet another non-limiting example, an action titled "Purchase new computer" that a user has assigned to user's paralegal may be included on waiting list.

With continued reference to FIG. 1, task performance list may be customized to a user. For example, a task performance list containing action list may be customized to action items that user needs to perform. In such an instance, project list may contain projects that user needs to perform and waiting for list may include tasks assigned by the user to other people. For example, an action such as make a phone call that the user has assigned to another person would appear on the user's task performance list under the waiting for list. In such an instance, the person who has been assigned the action to make the phone call would see the phone call on that person's action list. Action list customized to user may contain actions assigned by user and/or another person. Action list customized to user contains only actions assigned to user. For example, an action that user's spouse will perform will not be contained on user's own individual action list. Action list customized to user contains only actions that do not contain any sub-tasks. Projects list customized to user may contain projects assigned by user and/or another person. Project list customized to user contains only projects assigned to user. For example, a project that user's secretary will person will not be contained on user's own individual project list while a project that user will perform will be contained on user's individual project list. In an embodiment, user's project list may contain a mix of projects that may pertain to different areas of user's life. For example, user's project list may contain a personal project such as remodeling user's kitchen, a work-related project such as hire a new secretary, and a leisure time activity such as find new team member for user's recreational rugby team. User's project list will contain sub-tasks relating to each project. Waiting for list customized to user contains tasks assigned by user. Waiting for list customized to user contains tasks assigned to another person. Waiting for list customized to user may contain actions and/or projects and may or may not contain sub-tasks.

With continued reference to FIG. 1, task performance list including action list, project list, and/or waiting for list may contain data entry fields containing information specific and/or unique to each task. In an embodiment, certain data entry fields may be required, whereby a user must enter information in a specific data entry field. Data entry fields may include without limitation a task identifier that uniquely identifies each task. Data entry fields may include without limitation a task name. Task name may be searchable by a user who may be looking for a specific task.

With continued reference to FIG. 1, data entry field may include without limitation a created by field that may contain information as to who initially created the task. Data entry field may include without limitation a task creation date, which may include information as to what date the task was initially created. Data entry field may include without limitation an assigned by field, which may include information as to what user assigned the task, who may be known as the assignor. Data entry field may include without limitation assigned to field, which may include information as to whom the task is assigned to, and this person may also be known as the assignee. In an embodiment, a task may by default be assigned to the task creator or user, who must then choose to assign the task to another. Data entry field may include without limitation a task assigned date field, which may include information as to the date the task was assigned to another person by the task creator and/or assignor. In an embodiment, task assigned date field may be the same as the task creation date such as for example when a task is created and then assigned on the same day. In an embodiment, task assigned date field may be different than the task creation date such as for example when a task is created on a different day than the day the task is assigned. Data entry field may include without limitation start date, which may include information as to when work should commence on the task. In an embodiment, the task may be shown to be on hold before the start date. For example, a task having a start date two weeks in the future will be shown to be on hold for the two weeks until the actual start date occurs. In an embodiment, a user may modify a start date, even if a task has already been assigned. Data entry field may include without limitation due date field, which may include information as to the date when the task must be completed by. In an embodiment, user and/or task assignor may change a due date even if the task has been assigned. In an embodiment, another person and/or assignee who may wish to change due date set by an assignor may request a due date change to the assignor in order to get the date changed. Data entry field may include without limitation date completed field, which may include information as to the date that the assignee marks a task as completed. Data entry field may include without limitation date approved field, which may include information as to the date that the assignor may give approval to the task. In an embodiment, when a task has not been assigned such that the assignee and assignor are the same user, then the date completed, and the date approved will contain the same information. Data entry field may include without limitation relates to field, which may include information describing a physical object or other item that the task relates to. In an embodiment, relates to field may include a description of an item that a task may relate to such as a house, code module, vehicle, building and the like. In an embodiment, relates to field may include a description of a non-physical item that a task may relate to such as a personal goal, objective, mission, and the like. Data entry field may include without limitation sub-tasks field, which may include information describing a sub-task as a part of a project. In an embodiment, a sub-task may be optional. Data entry field may include without limitation description field, which may include information containing information that a task creator may enter to describe a task. In an embodiment, description field may be a required field and may be modified by creator and/or assignor of a task. Data entry field may include without limitation messages field, which may include message and/or emails compiled that relate to the task. Data entry field may include without limitation files field, which may include files relating to the task. For example, a task such as obtaining 3 price estimates for a kitchen remodel may contain a file containing the 3 separate price estimates. In yet another non-limiting example, a task such as interview candidates for San Francisco position may include several files with each file containing application materials for each specific candidate. Data entry field may include without limitation shared with field, which may include information pertaining to who a task has been shared with. Data entry field may include without limitation location field, which may include information describing where the task may be performed. For example, location field may include data entries such as work, home, driving, phone, and the like. In an embodiment, location may be selected by a user from a drop-down menu selection that a user may highlight the appropriate location. Location drop-down menu selection may be unique to each user and locations may be added and subtracted from the drop-down menu by a user. In an embodiment, a task that has been assigned to another user may not contain a data entry in the location field, so that the user who will perform the task will select from user's own location list where the task will be performed.

With continued reference to FIG. 1, data entry field may include without limitation effort to complete field, which may include information describing how long the task will take to be completed. In an embodiment, a task that contains sub-tasks such as a project, will have values for the time to complete sub-tasks added up from each individual sub-task and added into the total time to complete the project. In an embodiment, a task containing sub-tasks such as a project may calculate effort to complete by adding and totaling effort to complete for all sub-tasks. Effort to complete field may also contain without limitation an effort units field, which may contain information reflecting the units such as minutes or hours necessary to complete a task. In an embodiment, sub-tasks that may be part of a project may not contain a value but will be added into the total effort units to complete the project that the sub-tasks are a part of. For example, a project containing 3 separate sub-tasks that will each take 1 hour to complete will have an effort to complete of 3 hours with the effort units reflected as hours. In yet another non-limiting example, a project containing two sub-tasks that will each take 10 minutes to complete will have an effort to complete of 20 minutes with the effort units reflected as minutes. Data entry field may include without limitation appointments field, which may include information describing tasks that take place at a specific time and may have more than one assignee as described in more detail below. Data entry field may include without limitation recurrence field, which may include tasks that are performed on a recurring basis. For example, a task such as driving children to piano lessons may occur on a recurring basis such as every Thursday afternoon, and as such recurrence field may contain information reflecting this. Data entry field may include without limitation private notes field, which may include information relating to a task that are created by either a task creator and/or assignee and which may only be viewed by the task creator and/or assignee. In an embodiment, a user such as a task creator and/or assignee who creates a private note may share information contained within the private only if the task creator and/or assignee who created the private note grants such permission. Data entry field may include without limitation priority field, which may include information pertaining to the importance of a task. In an embodiment, priority field may include an entry such as normal priority such as when the task is not associated with additional importance. In an embodiment, priority field may include an entry such as high priority such as when a task is associated with additional importance. In an embodiment, assignor and assignee may have a different value for the priority field. Data entry field may include without limitation hold/release field, which may contain information as to whether or not a task has commenced. For example, hold/release field may contain an entry such as "on hold" if a task has not started yet. In an embodiment, an assignor may release a task before it leaves an "on hold" status.

With continued reference to FIG. 1, data entry field may include without limitation status field, which may include information reflecting whether an assignee has accepted and/or rejected a task from an assignor. In an embodiment, a task that has been accepted by an assignee may contain an entry in status field of "accepted" while a task that has been rejected by an assignee may contain an entry in status field of "rejected." Status field may also contain information describing status of tasks and sub-tasks. For example, when all sub-tasks for a project are completed the status of the project may contain an entry such as "sub-tasks complete." In an embodiment, an assignee may make a task as complete when assignee completes a task. For example, a user may assign a task such as obtain a price quote on new furniture to user's assistant, who may update the status of the task to complete after user's assistant has obtained price quote. In an embodiment, a user such as an assignor who has created a task can enter text into an approved field to reflect that a task has been completed and that assignor has granted approval on the task. Status field may be updated to reflect status throughout start date and due date. For example, a task may be labeled as "on track" such as when the task has not been given approval by task owner and it is not due or late. In yet another non-limiting example, a task may be labeled as "due" such as when the due date has closed, such as on the day of the established due date. In yet another non-limiting example, a task may be labeled as "late" when the due date has passed for a task.

With continued reference to FIG. 1, language processing module 128 may assign at least a request to at least a task performance owner. In an embodiment, at least a request for a task performance may be initially assigned to the user that created the at least a request for at ask performance. For example, a user who creates at least a request for a task performance such as rake the leaves may be initially assigned to user as task performance owner. User may then assign the at least a request for a task performance to another individual, known as assignee. Assignee may be a friend, family member, co-worker, colleague, other user of system 100, and the like. In an embodiment, assignee may not be a user of system 100 and may be contacted through an email notification. For example, a user who wishes to assign at least a request for a task performance to user's sister who does not participate in system 100 may email user's sister the at least a request for a task performance. In such an instance, an email notification sent to a user who does not participate in system 100 may contain a brief description of the at least a request for a task performance along with information about the at least a request for a task performance. In such an instance, there may be a link that a user may click on to enable a screen that may bring a non-user of system 100 to a screen for non-users. In an embodiment, an email sent to a nonuser of system 100 may contain a messaging link which may enable a nonuser to communicate with assignor of at least a request for a task performance. For example, a nonuser may wish to communicate with assignor to collect more details and questions concerning at least a request for a task performance. In an embodiment, an assignee who accepts at least a request for a task performance may form a connection with assignor who assigned the at least a request for a task performance which may be documented within a data field contained within the at least a request for a task performance. For example, a user who assigns at least a request for a task description such as obtain price quote on new shutters to user's secretary, may appear within the at least a request for a task description to obtain price quote on new shutters once user's secretary has accepted. In such an instance, the connection between user and user's secretary may be documented within notes section of the at least a request for a task description as described above in more detail. In such an instance, the at least a request for a task description containing a task to obtain a price quote on new shutters may appear on user's waiting for list and may appear on user's secretary's action list.

With continued reference to FIG. 1, language processing module 128 may determine that the at least a request for a task performance includes a task performance identifier and generates at least a task performance data element as a function of the task performance identifier. Task performance identifier as used herein may include any information containing information relating to one or more data entry fields describing at least a request for a task performance. Data entry fields may include any of the data entry fields as described above in more detail. Data entry fields may include information containing detailed information about at least a request for a task performance. This may include for example, a description of when a task performance may need to be started or when the task performance needs to be completed. Language processing module 128 may extract task performance identifier using any of the methodologies as described above. This may include for example, generating algorithms and utilizing machine-learning processes as described in more detail below. Language processing module 128 may generate at least a task performance data element utilizing the task performance identifier. Task performance data element as used herein, includes a task description containing a task performance list label and a priority label. Task may include any job that needs to be completed. Job may include any item that a user needs to complete whether relating to a user's personal life, family life, home life, work life, free time activity like, community life, and the like. Job may relate to any facet of a user's life. For example, a job may include a personal job such as mowing user's lawn or a work job such as organizing files for review. In an embodiment, jobs may overlap between different aspects of a user's life. In an embodiment, task performance data element may contain additional information such as a task performance owner.

With continued reference to FIG. 1, language processing module 128 may include a task performance learner 144 configured to generate at least a task performance data element as a function of the task performance identifier. Task performance learner 144 may include any hardware and/or software module. Task performance learner 144 may be designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

With continued reference to FIG. 1, task performance learner 144 may be designed and configured to generate at least a task performance data element by creating at least a first machine-learning model 148 relating inputs such as a task performance datum and/or a task performance identifier to outputs that may include at least a task performance data element, such as by using a first training set. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, at least a server 104, language processing module 128, and/or task performance learner 144 may be configured to receive training data to generate at least a first machine-learning model 148. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. In an embodiment, first training set may include a plurality of first data entries, each first data entry including at least a task performance identifier and at least a correlated task performance data element. Such training data may be utilized by task performance learner 144 to generate outputs that include task performance data elements as a function of receiving at least a task performance identifier utilizing the training data and the first machine-learning model 148. In an embodiment, task performance learner 144 may utilize training data to generate outputs such as categorizing requests for task performances. In an embodiment, task performance learner 144 may receive training data including at least a request for task performances and a correlated task performance list. Task performance learner 144 may utilize at least a request for a task performance and associated training data to generate a machine-learning model to assign tasks to task performance lists. Data describing requests for task performances that have been categorized to task performance list may be utilized to update outputs generated by task performance learner 144.

Continuing to refer to FIG. 1, machine-learning algorithm used to generate first machine-learning model 148 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, language processing module 128 may generate task performance data element output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenherg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using first training set; the trained network may then be used to apply detected relationships between elements of task performance identifiers and/or task performance datums and task performance data elements.

With continued reference to FIG. 1, language processing module 128 may contain task performance database 152. Language processing module 128 may extract at least a datum from task performance database 152 using the at least a request for a task performance and generate at least a task performance data element as a function of the at least a datum. Task performance database 152 may include tables containing information relating to a task performance data element as described in more detail below in reference to FIG. 4. In an embodiment, language processing module 128 may extract at least a datum from language database 140.

With continued reference to FIG. 1, system 100 includes a task generator module 156 operating on the at least a server. Task generator module 156 may include any suitable hardware or software module. Task generator module 156 may be designed and configured to generate at least a task performance data element as a function of the at least a task performance datum and containing a task performance list label and a priority label. Task performance list label may include a label including reference to a task performance list that the at least a request for a task performance may be assigned to. Task performance list label may include any of the task performance lists as described above including action list, project list, and/or waiting for list. Details describing task performance list are described in more detail below in reference to FIG. 2. Priority label may include a label describing information pertaining to importance of at least a request for a task performance. Priority label may include any of the labels as described above including a label such as normal when at least a request for a task performance contains no additional importance or high such as when at least a request for a task performance contains additional importance.

With continued reference to FIG. 1, task generator module 156 may include task performance label generator 160. Task performance label generator 160 may generate list label indicating task performance list that request for at least a task performance may be assigned to. Task performance label generator 160 may generate a label such as action when at least a request for a task performance may be assigned to action list. Task performance label generator 160 may generate a label such as project when at least a request for a task performance may be assigned to project list. Task performance label generator 160 may generate a label such as waiting for when at least a request for a task performance may be assigned to waiting for list. In an embodiment, task performance label generator 160 may generate label with information provided by language processing module 128 such as parser 136 and/or language database 140.

Continuing to refer to FIG. 1, task generator module 156 may include priority label generator 164. Priority label generator 164 may generate priority label regarding priority of at least a request for a task performance. Priority label generator 164 may generate a label such as normal when at least a request for a task performance contains no additional importance. Priority label generator 164 may generate a label such as high when at least a request for a task performance contains additional importance. In an embodiment, task performance label generator 160 may generate label with information provided by language processing module 128 such as parser 136 and/or language database 140.

Continuing to refer to FIG. 1, task generator module 156 may include task performance owner generator 168. Task performance owner generator may generate a label indicating owner of at least a request for a task performance. Task performance owner may include an individual who is in charge of giving approval to at least a request for a task performance. Approval may indicate that at least a request for a task performance is complete. Task performance owner generator 168 may generate a label containing a name of an individual who is the task performance owner for at least a request for a task performance. In an embodiment, task performance owner generator 168 may generate label with information provided by language processing module 128 such as parser 136 and/or language database 140.

With continued reference to FIG. 1, system 100 may include a transmission source module 172 operating on the at least a server. Transmission source module 172 may include any suitable hardware or software module. Transmission source module 172 may be designed and configured to transmit the at least a task performance data element containing the task performance datum list label and the priority label to at least a user device 112. User device 112 may include any of the user device 112s as described above.

Figure 2:
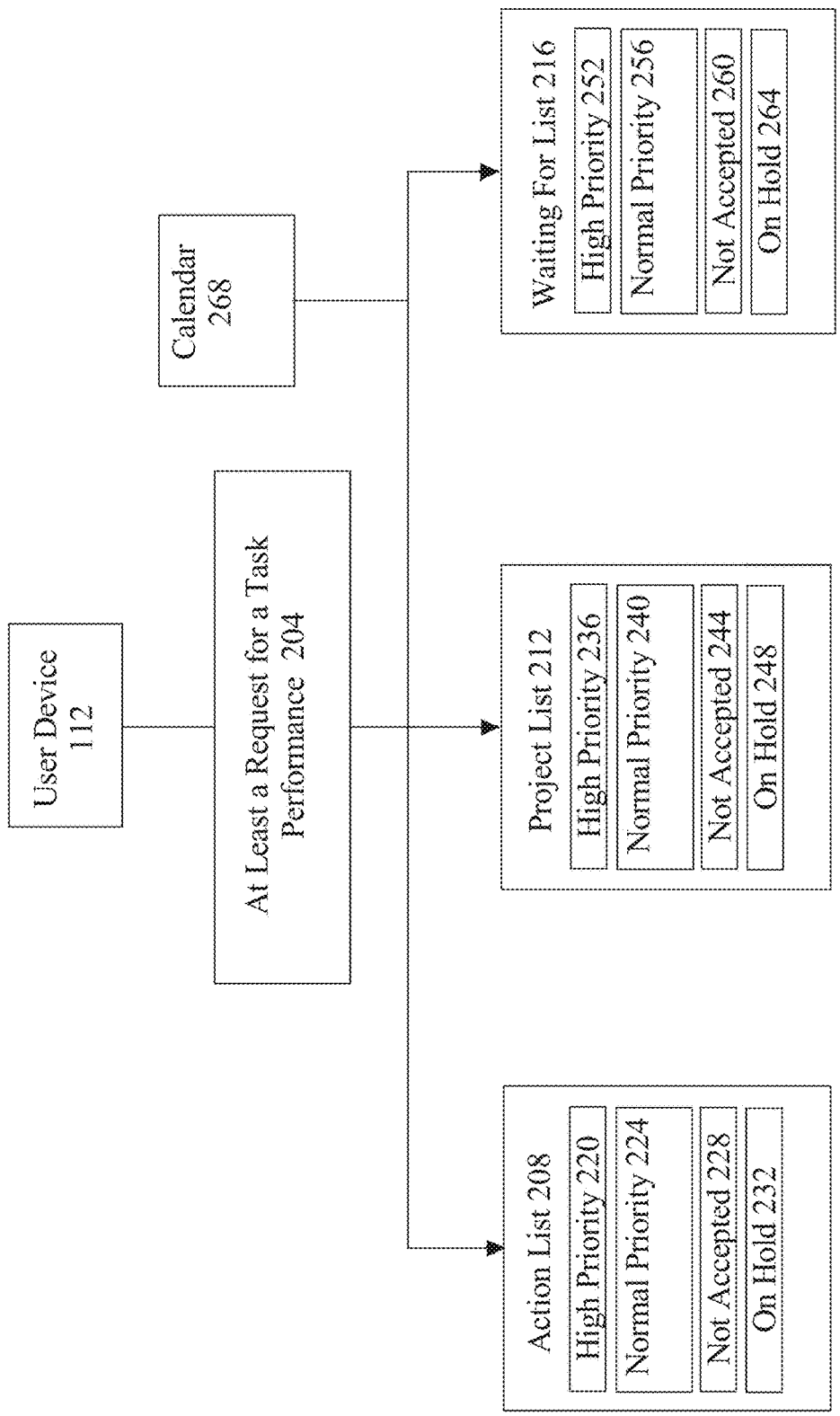
FIG. 2 is a block diagram illustrating an exemplary embodiment of a task performance list.

Referring now to FIG. 2, an exemplary embodiment of task performance lists as displayed to a user such as through GUI 116 is illustrated. Task performance list may include a description as to the category of at least a request for a task-performance. In an embodiment, all requests for at least a request for a task performance 204 may be initially placed onto an uncategorized list. Uncategorized list may include a master list containing all tasks from all users that are unprocessed. Tasks that are unprocessed may include for example tasks that have not yet been assigned to a task performance list. Task performance list may include an action list 208, project list 212, and a waiting for list 216. Action list 208 may include any of the action lists as described above in reference to FIG. 1. Action list may include any actions that a user needs to perform. Action includes any task that does not include sub-task. Task performance list may include a project list 212. Project list 212 may include any of the project lists as described above in reference to FIG. 1. Project list may include any projects that a user needs to perform. Project includes a task that includes at least a sub-task. Task performance list may include a waiting for list 216. Waiting for list 216 may include a list of tasks assigned by a user to other people. Waiting for list 216 may contain an action and/or a project. In an embodiment, each task performance list may be customized to a user whereby action list 208 includes actions only user needs to perform, project list 212 includes projects user is involved with, and waiting for list contains only tasks such as actions and/or projects that user has assigned to others. In an embodiment, tasks such as actions and/or projects may appear on several lists such as when a user has assigned a sub-task of a project to another person and user is also completing a sub-task of the same project. In such an instance, the project would appear on user's project list 212 and the project would also appear on user's waiting for list 216, and the project would appear on the other person's project list 212. In an embodiment, tasks such as actions and/or projects may be mobile and may switched between task performance lists. For example, an action may initially be included on action list 208, and later may have a sub-task added to it, thereby moving it to project list 212. In yet another non-limiting example, a project listed on project list 212 and containing only sub-tasks to be completed by user may also later appear on waiting for list 216 when user assigns a sub-task of the project to another person. In yet another non-limiting example, a project containing only one sub-task that appears on project list 212 may be moved to action list 208 if the sub-task is later completed and/or deleted.

With continued reference to FIG. 2, task performance lists may be further categorized into further lists. In an embodiment, at least a request for a task performance may be received from user device 112 such as by user input such as speech or text via GUI 116. In an embodiment, action list 208 may be categorized into lists based on priority of action list task performances. Action list 208 may include further lists that may include high priority list 220 that may include actions that are of high priority. High priority list 220 may include for example, actions that may have a close due date and/or that are of high value and meaning such as a friend's wedding reception. Normal priority list 224 may include actions that are of regular importance such as everyday tasks or weekly appointments. Action list 208 may also contain a not accepted list 228 that may contain actions that a user has not yet accepted. Action list 208 may also contain an on hold list 232 for actions that are not ready to be performed. Project list 212 may be categorized into lists based priority of project list task performances. Project list 212 may include high priority list 236 that may include projects that are of high priority. High priority list 236 may include for example, projects that may have multiple sub-tasks and/or projects that are complex and take a long time to complete. Normal priority list 240 may include projects that are of regular importance such as projects that may not have an upcoming due date or projects that are not very complex and may not take tremendous amounts of time for a user to complete. Project list 212 may contain not accepted list 244 that may contain projects that a user has not yet accepted. Project list 212 may contain on hold list 248 for projects that will not be performed right away. For example, a project that contains a start date at a later date in the future may be placed on project on hold list 248. Waiting for list 216 may include high priority list 252 which may contain tasks including actions and/or projects that have been assigned to other individuals are of high priority. High priority waiting for list 252 may include for example, complex projects that have multiple sub-tasks that have been assigned to other individuals. Waiting for list 216 may include normal priority list 256 which may include actions and/or projects that are of regular importance and that have been assigned to other individuals. Waiting for list 216 may contain not accepted list 260 which may include tasks that have been assigned to another individual and have not yet been accepted by that individual yet. Waiting for list 216 may include on hold list 264 which may include actions and/or projects that have been put on hold and are not actively pursued at the current moment. In an embodiment, calendar 268 may aid in placing task performances on different task performance lists. For example, at least a request for a task performance received from user device 112 that has a start date three weeks down the road and does not contain any sub-tasks may be placed on action on hold list 232.

Figure 3:
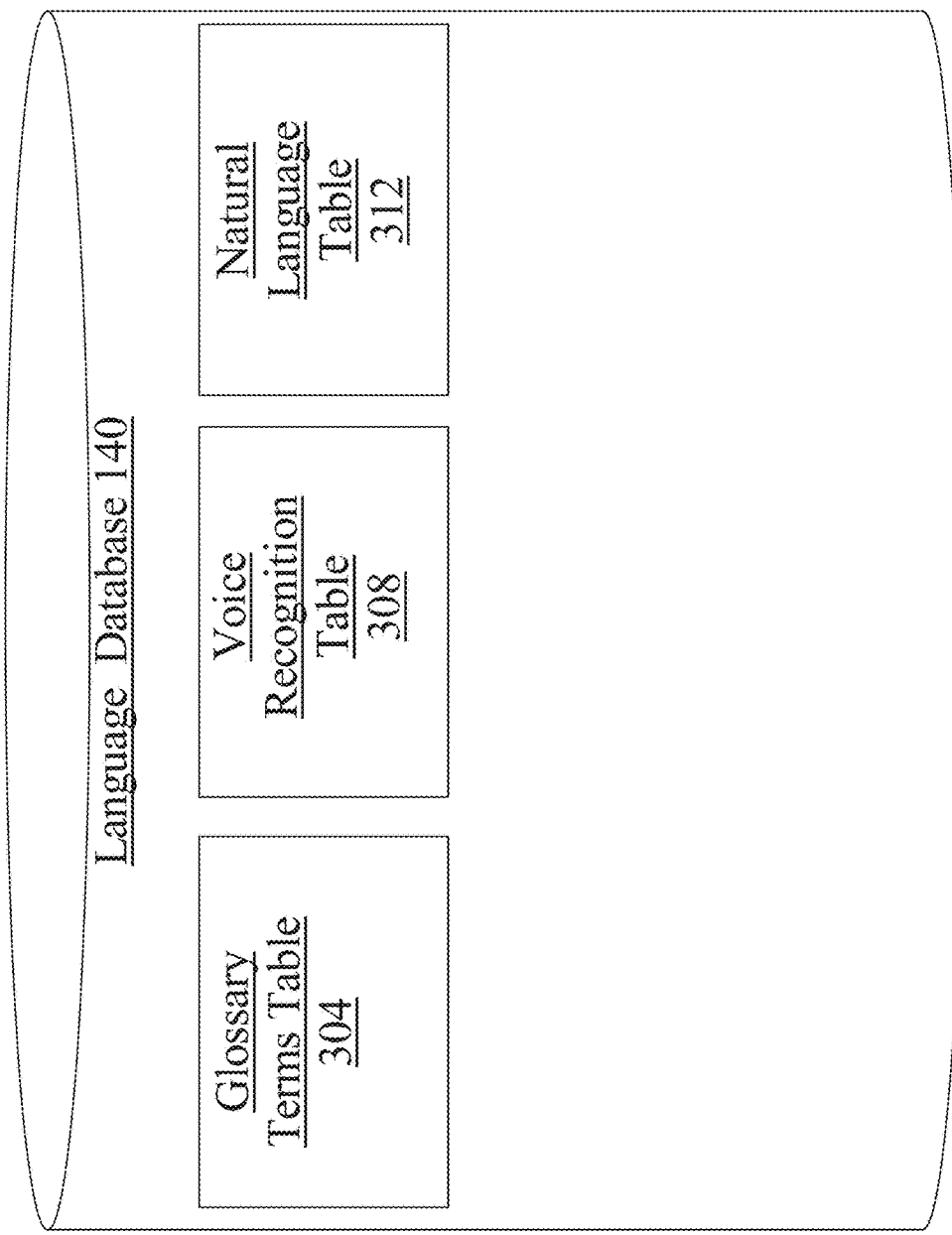
FIG. 3 is a block diagram illustrating an exemplary embodiment of a language database.

Referring now to FIG. 3, an exemplary embodiment of language database 140 is illustrated. Language database 140 may be implemented as any database and/or datastore suitable for use as a database. One or more database tables in task performance database may include glossary term table 304. Glossary term table 304 may contain terms and commands that may be specific to at least a request for a task performance. Glossary term table 304 may contain terms and commands that may be specific to a user and/or a group of users such as co-workers or family members and may not be known by others outside the group and as such may not parse correctly. For example, common adjectives may be dropped from names such as when Frank says drive my car users in the group would know which car belonged to Frank so that at least a request for a task performance that said "drive Frank's car" would not need additional information such as "drive Frank's minivan." Language database 140 may include voice recognition table 308 that may identify spoken commands and associates spoken commands with a user. Voice recognition table 308 may be utilized such as when a user interfaces with GUI 116 through a voice to text option. For example, voice recognition table 308 may be utilized when a user generates at least a request for a task performance such as "mow my lawn" to associate user who commands such a task performance with Sally based on voice recognition of Sally's voice. This may assist a user in having control over generating commands so that users do not impersonate one another. Language database 140 may include a natural language table 312 that may contain information pertaining to meaning of common language terms used in general conversations. In an embodiment, natural language table 312 may comprise multiple specialized, plurally accessible library-type databases. Natural language table 312 may be utilized to understand the contents of the at least a request for a task performance.

Figure 4:
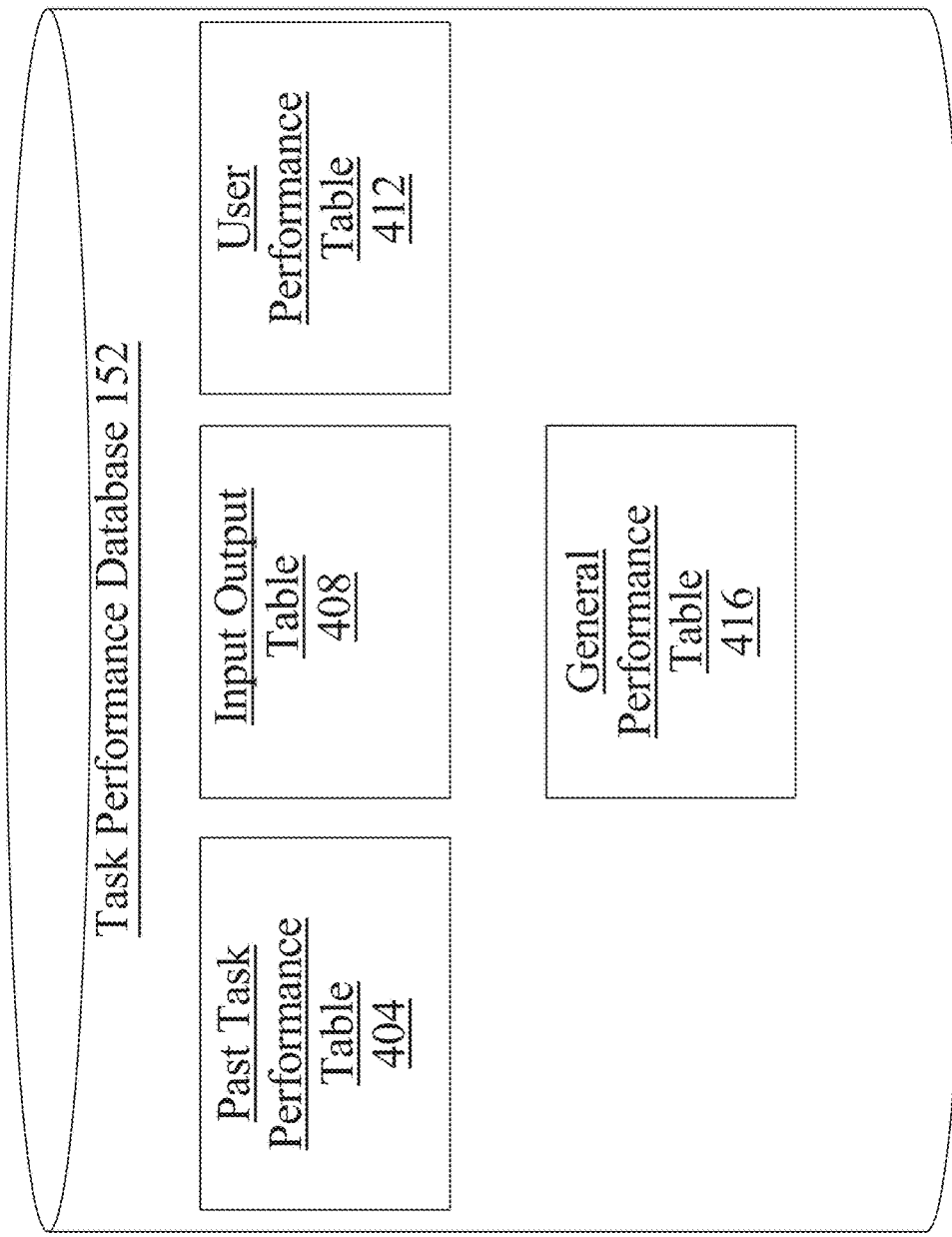
FIG. 4 is a block diagram illustrating an exemplary embodiment of a task performance database.

Referring now to FIG. 4, an exemplary embodiment of a task performance database 152 used by language processing module 128 is illustrated. Language processing module 128 may extract at least a datum from a database using the at least a request for a task performance datum and generate at least a task performance data element as a function of the at least a datum. Task performance database 152 may be implemented as any database and/or datastore suitable for use as a database. One or more database tables in task performance database 152 may include, without limitation, a past task performance table 404; past task performance table 404 may relate at least a request for a task performance to a previously performed past task performance. For example, at least a request for a task performance containing textual data such as "take the trash to the curb on Friday night" may be utilized to consult past task performance table 404 to determine if the same task had been previously performed and who performed the task. In such an instance, past task performance table 404 may include information as to categorization of similar past task performances such as whether taking the trash to the curb was an action and contained no sub-tasks and/or if it was a project and included other sub-tasks. Past task performance table 404 may include information regarding priority of past task performances. For example, a past task performance such as "organize church choir rehearsal" may have previously had a priority label such as normal whereas a past task performance such as "gather nonperishable food for hurricane victims" may have previously had a priority label of high. One or more database tables in task performance database 152 may include, without limitation, an input output table 408; input output table 408 may relate an input such at least a request for a task performance to an output such as a task performance list, a task performance owner and/or a priority label. For example, at least a request for a task performance such as "schedule dentist appoint" may be associated with an action list while at least a request for a task performance such as "organize church picnic" may be associated with a project list because it requires many sub-tasks in order to be completed. One or more database tables in task performance database 152 may include, without limitation, a user performance table 412; user performance table 412 may include information as to tasks such as projects and/or actions that user performs. For example, at least a request for a task performance that includes "mow the lawn" may not be assigned to a task owner such as user if mowing the lawn is not a task contained within user performance table 412. In an embodiment, user performance table 412 may be customized to a user and/or group of users. In yet another non-limiting example, at least a request for a task performance such as "prepare weekly reports" may be assigned to user if preparing weekly reports is included within user performance table 412 as a task user prefers to perform and/or has experience handling. One or more database tables in task performance database 152 may include, without limitation, general performance table 416; general performance table 416 may include information as to qualifications, certifications, skills, and/or standards that a user may need to have achieved in order to be assigned and/or complete at least a request for a task performance. For example, at least a request for a task performance such as "notarize deed for Fred" may not be assigned to a user who is not a notary. In yet another non-limiting example, at least a request for a task performance such as "drive Mark to surgery" may not be performed by a user who is not of legal age to drive a car. The above described tables and entries therein, are provided solely for exemplary purposes. Persons skilled in the art, upon reviewing the entirety of this disclosure, will be aware of various additional examples for tables and/or relationships that may be included or recorded in task performance database consistently with this disclosure.

Figure 5:
FIG. 5 is a block diagram illustrating an exemplary embodiment of a data input field.

Referring now to FIG. 5, an exemplary embodiments of data input fields contained within user task performance input GUI 120 is illustrated. Data input fields may include information pertaining to at least a request for a task performance as described in more detail above in FIG. 1. In an embodiment, user may enter information into data input fields by typing entries into fields and/or by using a voice to text option such as when a user may be driving a car or a user's hands may be tied up. In an embodiment, data input fields may contain a drop down menu that allows a user to select an option such as by highlighting a selection. Data input fields may include any of the data input fields as described above in FIG. 1, which may include for example, task ID, task name, created by, task creation date, assigned by, assigned to, task assigned date, start date, due date, date completed, date approved, relates to, sub-tasks, description, messages, files, shared with, location, effort to complete, effort units, appointments, recurrence, private notes, priority, hold status, and/or status.

Figure 6:
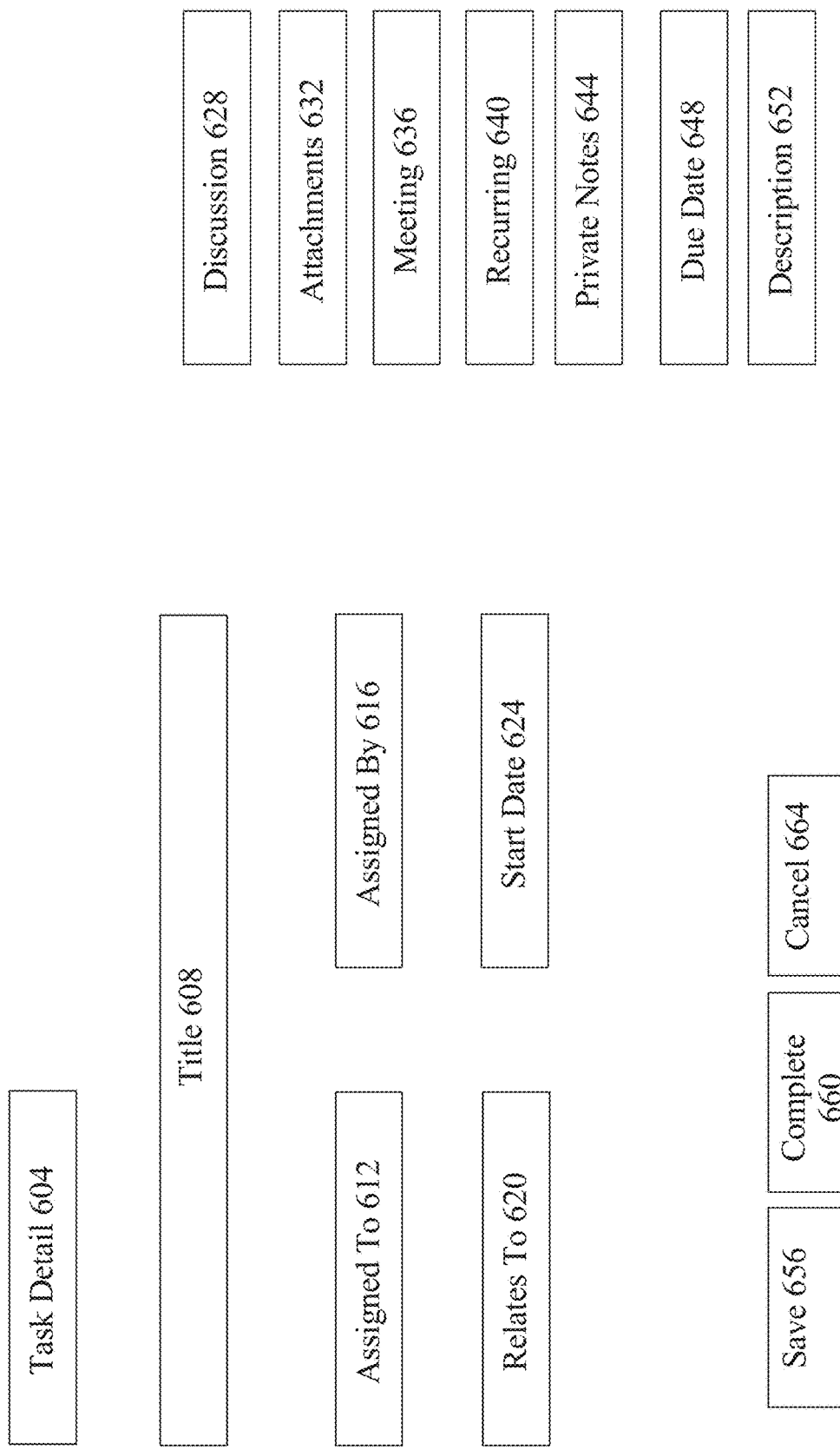
FIG. 6 is a block diagram illustrating an exemplary embodiment of a graphical user interface for a task detail.

Referring now to FIG. 6, an exemplary embodiment of a screen a user may enter information relating to at least a request for a task performance at GUI 116 is illustrated. In an embodiment, a user may enter information relating to at least a request for a task performance by entering information into data fields by either typing and/or voice to text option. In an embodiment, to create at least a request for a task performance and/or to view information pertaining to at least a request for a task performance user may select within GUI 116 task detail 604. Task detail 604 may contain information about at least a request for a task performance such as title 608, name of individual task has been assigned to 612, name of individual task has been assigned by 616, a description of what the task relates to 620, and/or start date 624 for the task. In an embodiment, task detail 604 may contain data fields that a user can click on and expand to find out more detailed information relating to at least a request for a task performance. This may include a discussion field 628 which may contain a log of all discussions relating to a particular task. In an embodiment, task detail 604 may contain an attachments field that may contain any additional files such as documents and photographs that may relate to a particular task. In an embodiment, task detail 604 may contain a meeting field 636 which may contain a log of all past, present, and/or future appointments relating a particular task. In an embodiment, task detail 604 may contain a recurring 640 field which may allow a user to schedule a task performance on a recurring basis such as an appointment that is held weekly. In an embodiment, task detail 604 may contain a private notes 644 field that may allow a user to enter private notes relating to a task. In an embodiment, private notes 644 may only be viewed by a user who entered private notes unless user grants permission to share private notes 644 with another. In an embodiment, task detail 604 may contain a due date 648 field that may contain information as to when a task needs to be completed by. In an embodiment, task detail 604 may contain a description 652 field which may contain information summarizing a particular task. Task detail 604 may contain data field that a user can select to update information contained within task detail 604, which may include a save 656 button to save any updates or information that a user has entered, a complete 660 button when a task has been completed such as when a task owner grants approval to a task, and a cancel button 664 when a user needs to cancel a change or selection a user has accidentally made.

Figure 7B:
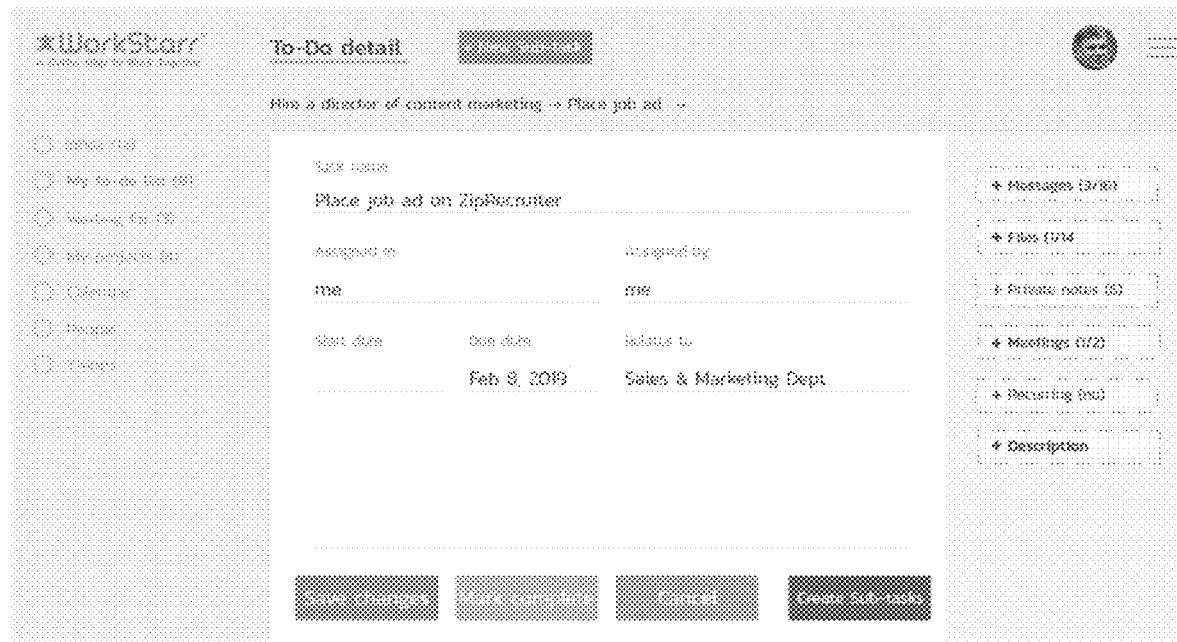
Figure 7C:
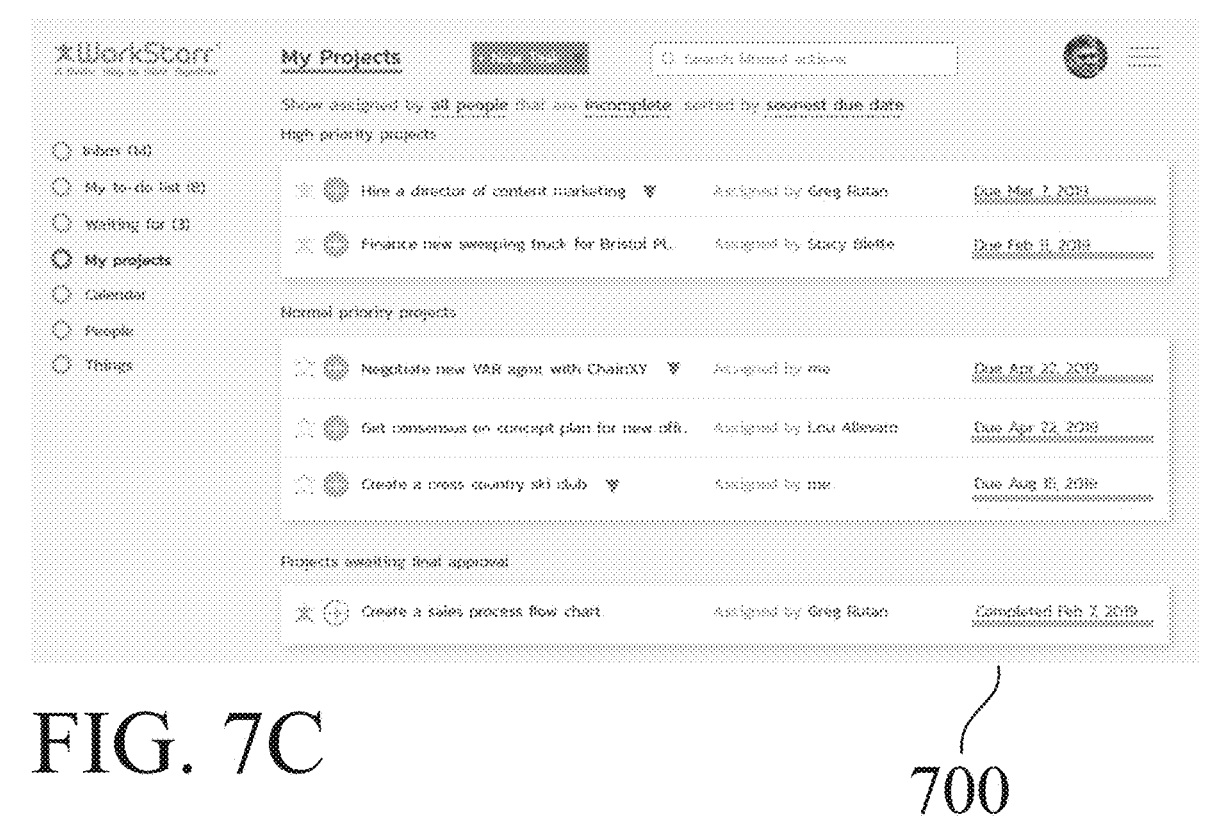
Figure 7D:
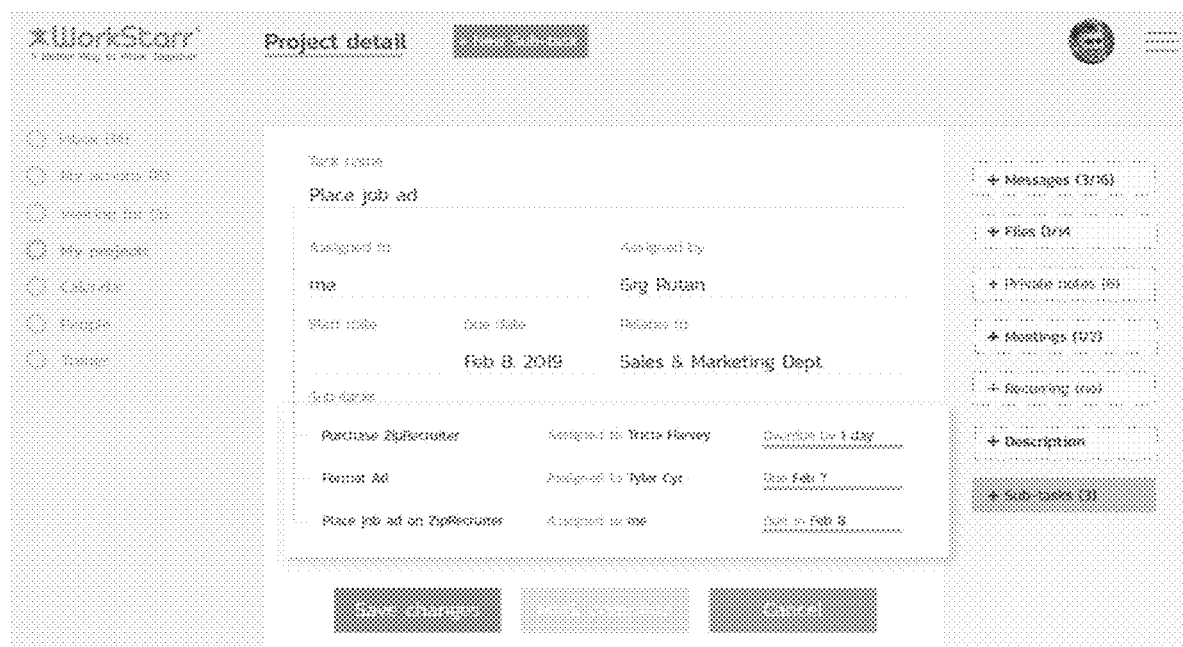
Figure 7E:
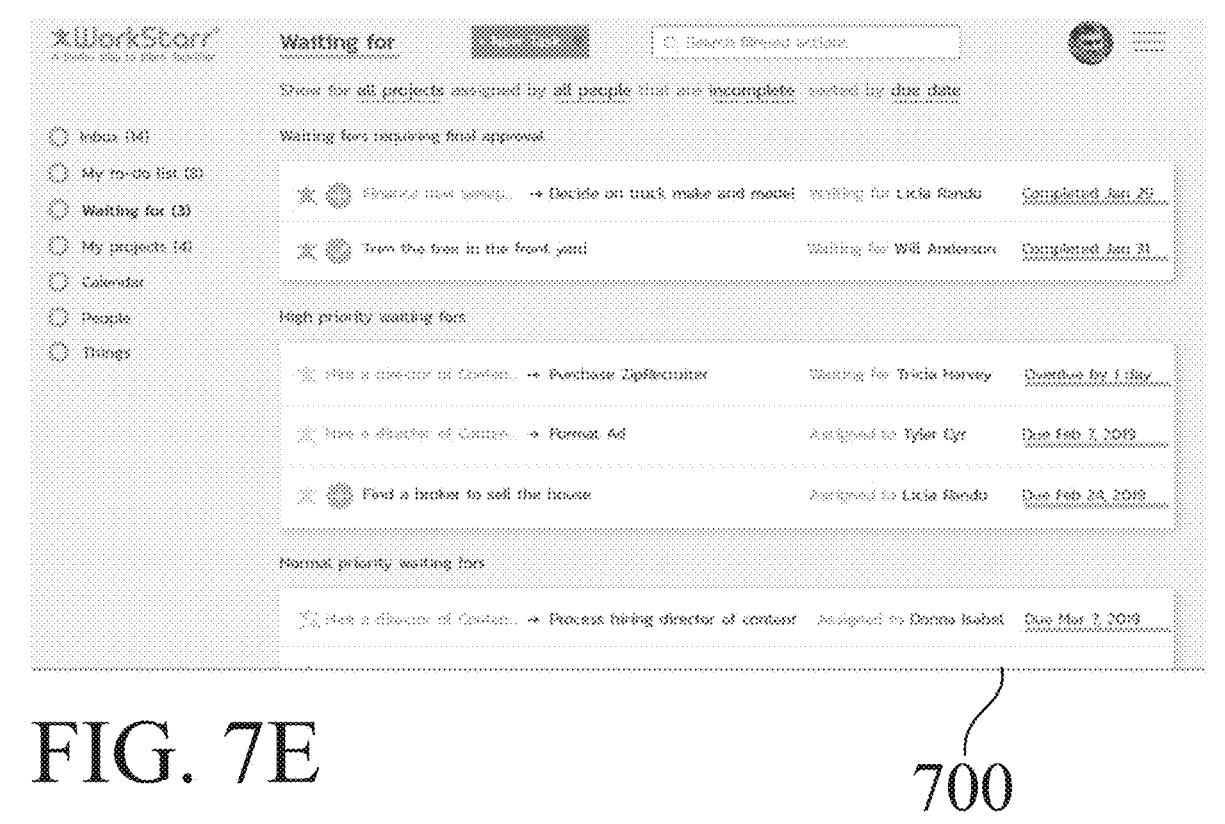
Figure 7F:
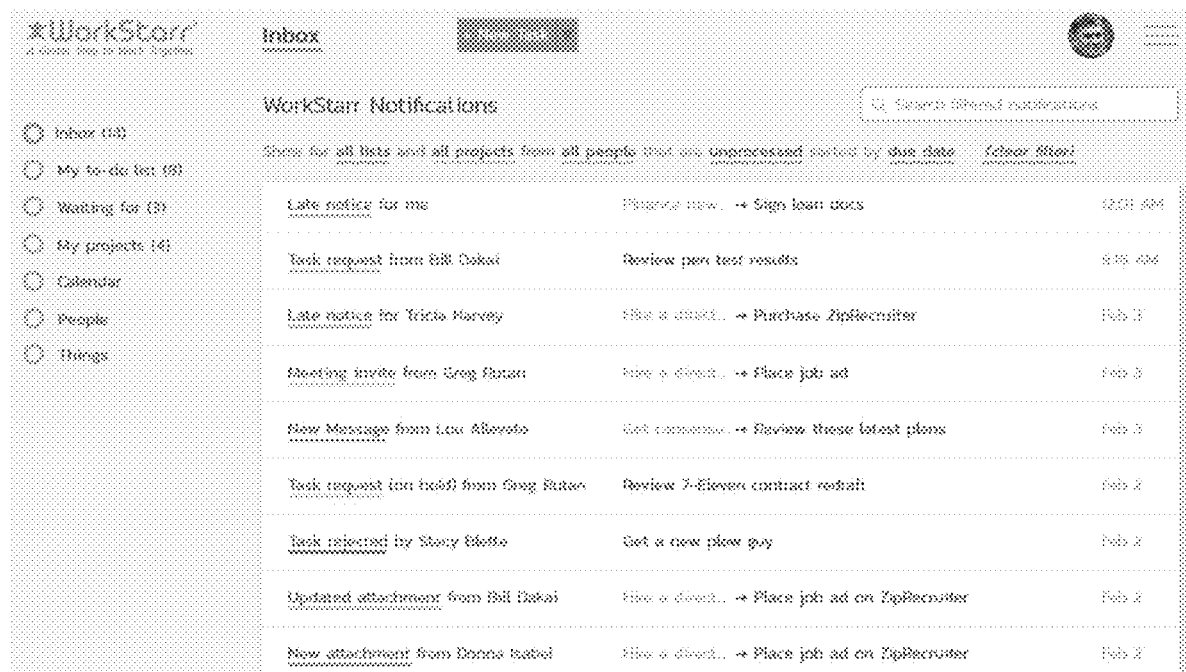

Referring now to FIG. 7A-F screenshots illustrating exemplary embodiments of GUI that a user may interact with and/or use to perform steps and processes in any of the methods described in this disclosure. GUI may function to translate machine-readable data into one or more fields, buttons, or the like into which users may enter commands into as an example, a textual field including any of the textual fields as described above in reference to FIGS. 1-5. For instance, and for illustrative purposes only, FIG. 7A shows a screen containing action list. In an embodiment, actions included on action list may be categorized by priority, with actions not yet accepted listed at the top of the action list, high priority actions listed in the middle of the action list, and normal priority actions listed at the bottom of the action list. In an embodiment, user may navigate to other task performance lists such as project list or waiting for list, as well as other categories such as calendar, people, and things by highlighting one of those options listed on the left side of the screen. FIG. 7B shows a screen containing an action detail where a user can fill in details pertaining to a specific action. For example, a user may fill in specific textual fields such as task name, assigned to, assigned by, start date, due date, and relates to. Action detail may allow a user to attach other materials and files relating to an action as listed on the right side of the screen, such as messages, files, private notes, recurring, and description. In an embodiment, textual fields and/or other materials may include any of the textual fields and/or other materials as described above in reference to FIGS. 1-6. FIG. 7C shows a screen containing project list. In an embodiment, a user may select a specific project contained within project list to expand information to reflect how many sub-tasks a particular project has completed at any given moment. In an embodiment, projects may be listed on project list by most recent projects to be added to project list. FIG. 7D shows a screen containing a project detail where a user can fill in specific textual fields pertaining a project such as task name, assigned to, assigned by, start date, due date, relates to, and sub-tasks. Project detail may allow a user to attach other materials and files relating to an action as listed on the right side of the screen, such as messages, files, private notes, recurring, and description. Project detail may allow a user to see different sub-tasks that comprise a project and see information such as who a particular sub-task has been assigned to as well as when a particular sub-task is due. FIG. 7E shows a screen containing a waiting for list. In an embodiment, waiting for list may be organized by priority, with high priority waiting for tasks listed at the top of the waiting for list, normal priority waiting for tasks listed in the middle of the waiting for list, and on hold waiting for tasks listed at the bottom of the waiting for list. In an embodiment, tasks listed on the waiting for list may contain information such as what person a user is waiting for completed a task listed on the waiting for list, as well as when the task is due. In an embodiment, user may navigate to other task performance lists such as action list or project list, as well as other categories such as calendar, people, and things by highlighting one of those options listed on the left side of the screen. FIG. 7F shows a screen containing an inbox list. Inbox list may contain a list compiling all lists a user may generate to include for example, all projects including actions from all people and which may be sorted by due date. In an embodiment, user may navigate to other task performance lists such as action list, project list, waiting for list, as well as other categories such as calendar, people, and things by highlighting one of those options listed on the left side of the screen.

Referring now to FIG. 8, an exemplary embodiment of a method 800 of textual analysis of task performance datums is illustrated. At step 805 the at least a server receives at least a request for a task performance. Receiving at least a request for a task performance may be performed utilizing any type of network transmission and/or network connection as described herein. At least a request for a task performance may include receiving at least an action. An action may include a task containing no sub-tasks as described in more detail above in reference to FIGS. 1-7. An action may include any of the actions as described above in reference to FIGS. 1-7. At least a request for a task performance may include receiving at least a sub-task. At least a sub-task may comprise a project and may include any of the sub-tasks and/or projects as described above in FIGS. 1-7. At least a request for a task performance may be received from a user device 112. User device 112 may include any of the user device 112s as described above in reference to FIG. 1. At least a request for a task performance may be received from a conversational response. Conversational response may include any of the conversational responses as described above in reference to FIG. 1, including for example emails or messages. Receiving at least a request for a task performance may include receiving at least a task performance file. Task performance file may include any of the task performance files as described above in reference to FIG. 1.

With continued reference to FIG. 8, at step 810 the at least a server parses the at least a request for a task performance to extract at least a task performance datum. Parsing may be performed by any of the methodologies as described above in reference to FIG. 1. Parsing may include normalizing one or more words or phrases contained within at least a request for a task performance, where normalization includes a process whereby one or more words or phrases are modified to match corrected or canonical forms; for instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like. Parsing may include performing algorithms such as those performed by language processing module 128 as described above in reference to FIG. 1. Parsing may include performing algorithms for name recognition. Name recognition may include a process whereby names of users, family members of users, co-workers of user, friends of users from sports, college, activities and the like are identified; this may include for example by searching for words, phrases, and/or names contained within task performance database 152. For example, language processing module 128 may identify a name contained within at least a request for a task performance, and may consult task performance database 152 to verify if the name is contained within one of the database tables such as if the name is contained within past task performance table 404 because the named user previously performed the task.

With continued reference to FIG. 8, parsing may be performed by extracting and/or analyzing one or more words or phrases by performing dependency parsing processes; a dependency parsing process may be a process whereby language processing module 128 and/or parser 136 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like; such detected syntactic structures may be related to each other using a data structure and/or arrangement of data corresponding, as a non-limiting example, to a sentence diagram, parse tree, or similar representation of syntactic structure. In an embodiment, language processing module 128 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

With continued reference to FIG. 8, parsing may include combining separately analyzed elements from at least a request for a task performance to extract at least a task performance datum; elements may include words, phrases, sentences, or the like, as described above. For instance, two elements may have closely related meanings as detected using vector similarity or the like; as a further non-limiting example, a first element may be determined to modify and/or have a syntactic dependency on a second element, using dependency analysis or similar processes as described above. Combination into at least a task performance datum may include, without limitation, concatenation. Alternatively or additionally, parsing may include detecting two or more elements in a single request for at least a task performance; for instance, parsing module may extract a conversational response and a user device response.

With continued reference to FIG. 8, parsing may include converting at least an element into at least a task performance datum for instance, and without limitation, once an element has been detected, parsing may convert it to a highly closely related task performance datum based on vector similarity, where the highly closely related element is labeled as a standard form or canonical element. Parsing may be performed by parser 136 as described in more detail above in FIG. 1. In an embodiment, converting to a standard form element may enable more efficient processing of element, as a reduced space of potential elements may be used to retrieve at least a task performance datum. In an embodiment, a datum may be retrieved from a database such as language database 140 and/or task performance database 152.

With continued reference to FIG. 8, parsing may extract at least a task performance datum. Task performance datum may include any of the task performance datums as described above that may include relevant information relating to the at least a request for a task performance. Relevant information may include for example information pertaining to a category of at least a request for a task performance, priority of the at least a request for a task performance and/or at least a task performance owner. For example, task performance datum may include information such as a high priority label given to at least a request for a task performance datum such as "terminate John's position on Monday." In yet another non-limiting example, task performance datum may include information such as "Billy will be task owner."

With continued reference to FIG. 8, at step 815 the at least a request for a task performance is categorized to at least a task performance list. Task performance list may include any of the task performance lists as described above in FIGS. 1-7. Categorizing the at least a request for a task performance may include assigning at least a request for a task performance to at least a task performance list. In an embodiment, at least a request for a task performance may be initially categorized into an uncategorized list, as described above in more detail in FIG. 2. Subsequently, at least a request for a task performance may be assigned to a task performance list including action list, project list, and/or waiting for list as described above in more detail in FIGS. 1-7. In an embodiment, at least a request for a task performance may be initially assigned to a task performance list such as action list because it does not contain any sub-tasks, but may be later moved to another list such as to project list when a sub-task is added.

With continued reference to FIG. 8, at step 820 the at least a request for a task performance is assigned to at least a task performance owner. Task performance owner as used herein includes the name of the individual who has been granted authority to grant approval to a task and mark it as complete. In an embodiment, task performance owner may or may not be the individual who may be completing a task. For example, John may generate an action that he will assign to Mary to complete, but John may still be named as the task owner because he will be in charge of granting approval to the task and ensuring that Mary has completed the task to his satisfaction. In an embodiment, task owner may be granted certain privileges such as delaying tasks and placing tasks on hold under the task owner decides to release the task.

With continued reference to FIG. 8, at step 820 the server generates at least a task performance data element as a function of the at least a task performance datum and containing at least a task performance list label and a priority label. Task performance list label may include a label indicating the task performance list that the at least a request for a task performance has been assigned to. For example, at least a request for a task performance that has been assigned to action list may contain a task performance list label that includes "action list." Priority label may include a label indicating importance of at least a request for a task performance. For example, at least a request for a task performance that has been deemed of additional importance because it needs to be completed quickly or is of great value to a company, may include a priority label that includes "high priority."

With continued reference to FIG. 8, the at least a task performance data element containing the task performance label and the priority label may be transmitted to at least a user device. User device may include any of the computing devices as described herein. Transmitting may include sending the task performance data element over a network connection and may be implemented, without limitation, as described herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
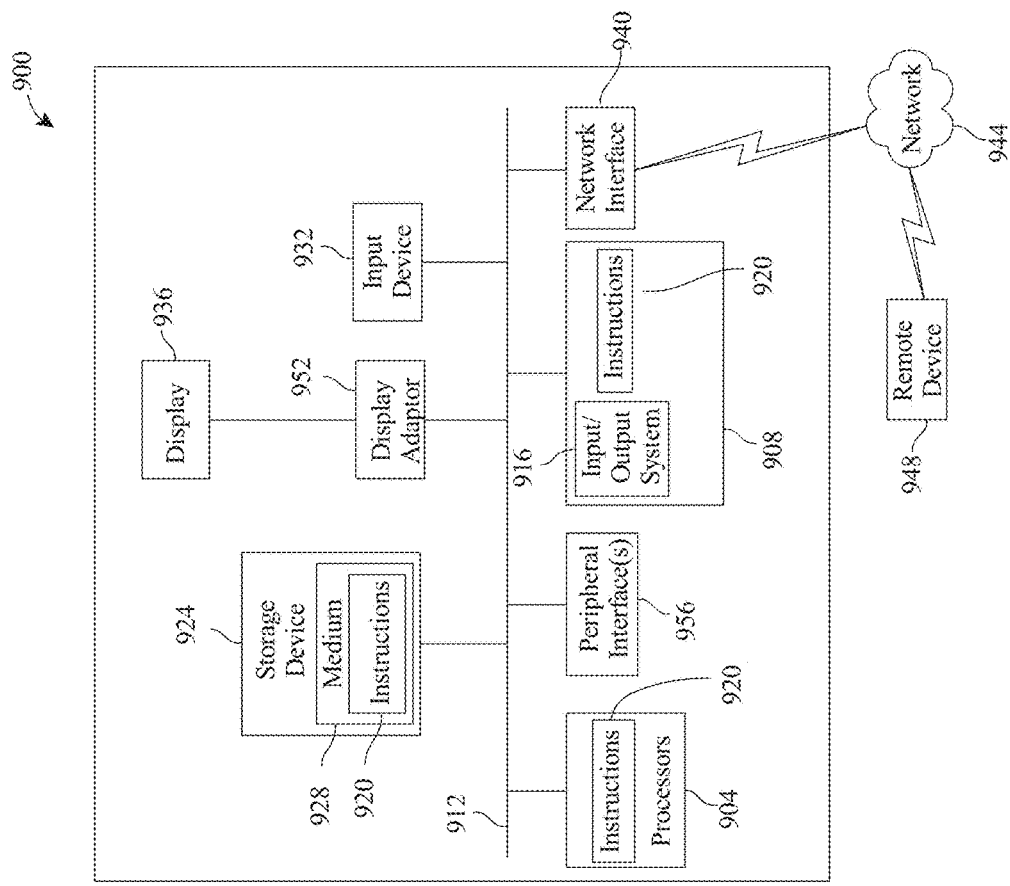
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for textual analysis of task performances the system comprising:
    at least a server;
    a receiving module operating on the at least a server wherein the receiving module is designed and configured to:
      receive at least a request for a task performance;
    a language processing module operating on the at least a server designed and configured to:
      parse the at least a request for a task performance and retrieve at least a task performance datum, wherein the task performance datum includes a number of subtasks;
      extract at least a datum from a database using the at least a request for a task performance;
      categorize the at least a request for a task performance to at least a task performance list as a function of the at least a datum; and
      assign the at least a request for a task performance to at least a task performance owner; and
      assign the at least a request for a task performance a priority; and
    a task generator module operating on the at least a server designed and configured to:
      generate at least a task performance data element as a function of the at least a task performance datum, wherein generating the at least a task performance datum comprises:
      generating a task performance list label as a function of the number of subtasks of the task performance datum;
      wherein the task performance list label comprises at least one selected from a group of an action list and a project list
      generating a priority list label comprising at least one selected from a group of a task priority, a task not accepted, and a task on hold; and
      assigning the at least a task performance datum to a predetermined list based upon the performance list label and the priority list label;
      wherein the at least a task performance data element is generated using a task performance learner and training data that outputs a task performance data element using a first machine-learning model, wherein the training data further comprises a plurality of data entries containing a request for a task performance and a correlated task performance list; and
    a transmission source module operating on the at least a server wherein the transmission source module is designed and configured to:
      transmit the at least a task performance data element containing the task performance list label and the priority list label to at least a user device, wherein the at least a task performance data element is configured to be storable on the at least a user device.

2. A system for textual analysis of task performance the system comprising:
    at least a server;
    a receiving module operating on the at least a server wherein the receiving module is designed and configured to:
      receive at least a request for a task performance;
    a language processing module including at least a task performance learner operating on the at least a server wherein the language processing module is designed and configured to:
      parse the at least a request for a task performance and retrieve at least a task performance datum;
      categorize the at least a request for a task performance to at least a task performance list as a function of the at least a request for a task performance datum; and
      assign the at least a request for a task performance to at least a task performance owner;
    a task generator module operating on the at least a server wherein the task generator module is designed and configured to:
      generate at least a task performance data element as a function of the at least a task performance datum, wherein generating the at least a task performance data element comprises:
      generating a task performance list label as a function of the number of subtasks of the task performance datum;
      wherein the task performance list label comprises at least one selected from a group of an action list and a project list;
      generating a priority list label comprising at least one selected form a group of a task priority, a task not accepted, and a task on hold; and
      assigning the at least a task performance datum to a predetermined list based upon the performance list label and the priority list label;
      wherein the task performance list label and the priority list label are generated using a task performance learner and training data that outputs a task performance data element using a first machine-learning model, wherein the training data contains a plurality of data entries containing a task performance identifier and a correlated task performance data element.

3. The system of claim 2, wherein the at least a request for a task performance further comprises at least an action.

4. The system of claim 2, wherein the at least a request for a task performance further comprises at least a sub-task.

5. The system of claim 2, wherein the at least a request for a task performance is received from a user device.

6. The system of claim 2, wherein the at least a request for a task performance is received from a conversational response.

7. The system of claim 2, wherein the at least a request for a task performance further comprises at least a task performance file.

8. The system of claim 2, wherein the language processing module is further configured to:
    determine that the at least a request for a task performance datum includes a task performance datum identifier; and generate at least a task performance data element as a function of the task performance datum identifier.

9. The system of claim 8, wherein the language processing module further comprises a task performance learner configured to generate at least a task performance data element as a function of the task performance datum identifier.

10. The system of claim 8, wherein the language processing module is further configured to:
- extract at least a datum from a database using the at least a request for a task performance; and
- generate at least a task performance data element as a function of the at least a datum.

11. A method of textual analysis of task performances the method comprising:
- receiving by at least a server at least a request for a task performance;
- parsing by the at least a server the at least a request for a task performance to extract at least a task performance datum;
- categorizing by the at least a server the at least a request for a task performance to at least a task performance list as a function of the at least a task performance datum;
- assigning by the at least a server the at least a request for a task performance to at least a task performance owner;
- generating by the at least a server at least a task performance data element as a function of the at least a task performance datum, wherein generating the at least a task performance data element comprises:
  - generating a task performance list label as a function of the number of subtasks of the task performance datum;
  - wherein the task performance list label comprises at least one selected from a group of an action list and a project list;
  - generating a priority list label comprising at least one selected from a group of a task priority, a task not accepted, and a task on hold; and
  - assigning the at least a task performance datum to a predetermined list based upon the performance list label and the priority list label;
- wherein the task performance list label and the priority list label are generated using a task performance learner and training data that outputs a task performance data element using a first machine-learning model, wherein the training data contains a plurality of data entries containing a task performance identifier and a correlated task performance data element.

12. The method of claim 11, wherein receiving the at least a request for a task performance further comprises receiving at least an action.

13. The method of claim 11, wherein receiving the at least a request for a task performance further comprises receiving at least a sub-task.

14. The method of claim 11, wherein the at least a request for a task performance is received from a user device.

15. The method of claim 11, wherein the at least a request for a task performance is received from a conversational response.

16. The method of claim 11, wherein receiving the at least a request for a task performance datum further comprises receiving at least a task performance file.

17. The method of claim 11, wherein parsing further comprises:
- determining that the at least a request for a task performance includes a task performance datum identifier; and
- generating at least a task performance data element as a function of the task performance identifier.

18. The method of claim 17, wherein generating at least a task performance data element occurs as a function of the task performance datum identifier.

19. The method of claim 17, wherein parsing further comprises:
- retrieving at least a datum from a database using the at least a request for a task performance; and
- generating at least a task performance data element as a function of the at least a datum.

* * * * *